United States Patent [19]

Vaeth et al.

[11] Patent Number: 4,563,561
[45] Date of Patent: Jan. 7, 1986

[54] MICROWAVE OVENWARE ASSEMBLY FOR POPPING GRAIN

[75] Inventors: Howard J. Vaeth, Wooster; Gregory M. Crook, Columbus, both of Ohio

[73] Assignee: Rubbermaid Incorporated, Wooster, Ohio

[21] Appl. No.: 608,809

[22] Filed: May 10, 1984

[51] Int. Cl.$^4$ ............... H05B 6/80; A23L 1/18
[52] U.S. Cl. ............... 219/10.55 E; 219/10.55 F; 99/323.5; 99/DIG. 14
[58] Field of Search ............... 219/10.55 E, 10.55 R, 219/10.55 F; 99/323.5, 323.8, DIG. 14, 451; 220/380, 4 B, 4 C, 4 D; 206/499; 426/243

[56] References Cited

U.S. PATENT DOCUMENTS

| | | | |
|---|---|---|---|
| 216,831 | 6/1879 | Collings | 220/4 B |
| 2,980,280 | 4/1961 | Herlow | 206/514 X |
| 3,722,399 | 3/1973 | Cole | 99/323.8 |
| 3,847,067 | 11/1974 | Munsey | 99/323.8 |
| 4,158,760 | 6/1979 | Bowen et al. | 219/10.55 E |
| 4,166,208 | 8/1979 | Martel et al. | 219/10.55 E |
| 4,299,160 | 11/1981 | Wokeck | 219/10.55 E X |
| 4,447,705 | 10/1984 | Danley et al. | 219/10.55 F X |
| 4,496,816 | 1/1985 | McNamara | 219/10.55 E |

FOREIGN PATENT DOCUMENTS

WO80/01483 7/1980 PCT Int'l Appl. .......... 219/10.55 E

OTHER PUBLICATIONS

Micro Chef, Jan. 1980—Bangor Plastics, Inc., Bangor, Michigan.
Nordic Ware, Jul. 1981—Nordic Ware, Minneapolis, Minnesota.
Regal Microwave Cookware, prior to 1982—Regal Ware, Inc., Kewaskum, Wisconsin.
Microwave Popcorn Popper, prior to 1982—Anchor Hocking Corp., Lancaster, Ohio.
Popcorn Popper, Jan. 1, 1984, Rubbermaid Incorporated, Wooster, Ohio.

*Primary Examiner*—Philip H. Leung
*Attorney, Agent, or Firm*—Richard B. O'Planick

[57] ABSTRACT

Nesting microwave-transparent receptacles are disclosed for popping grain, and comprise a popper receptacle (4) and a cover receptacle (2). The popper receptacle has an inverted pyramidal-shaped cavity (23) extending therein. The cover receptacle is profiled having one end for encapsulating orientation over the popper receptacle cavity in a popping mode of assembly, and an opposite end complimentarily profiled to seat within the cavity in a serving mode of assembly. Butter application means is provided to distribute melted butter to the popped kernels.

12 Claims, 8 Drawing Figures

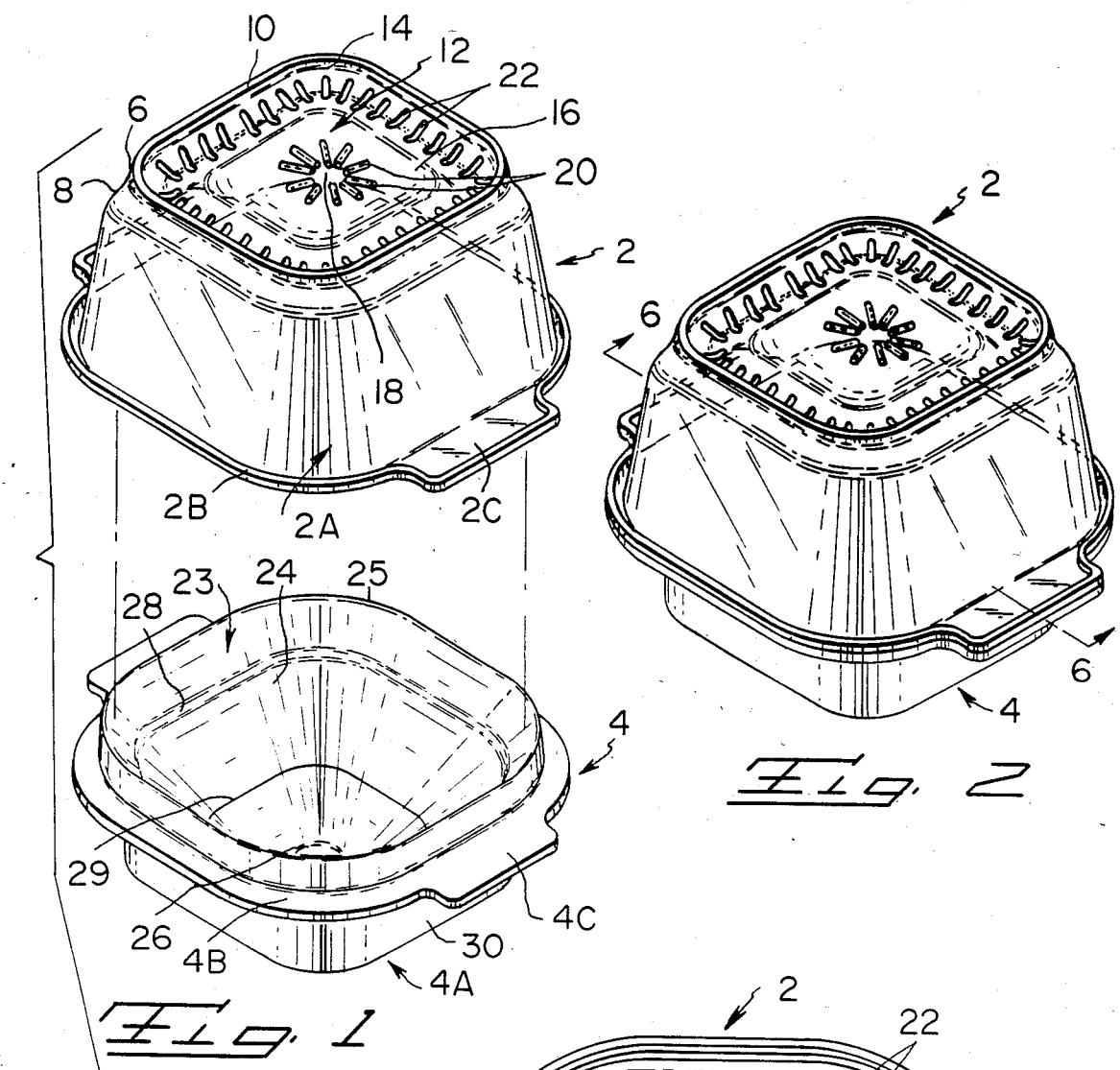
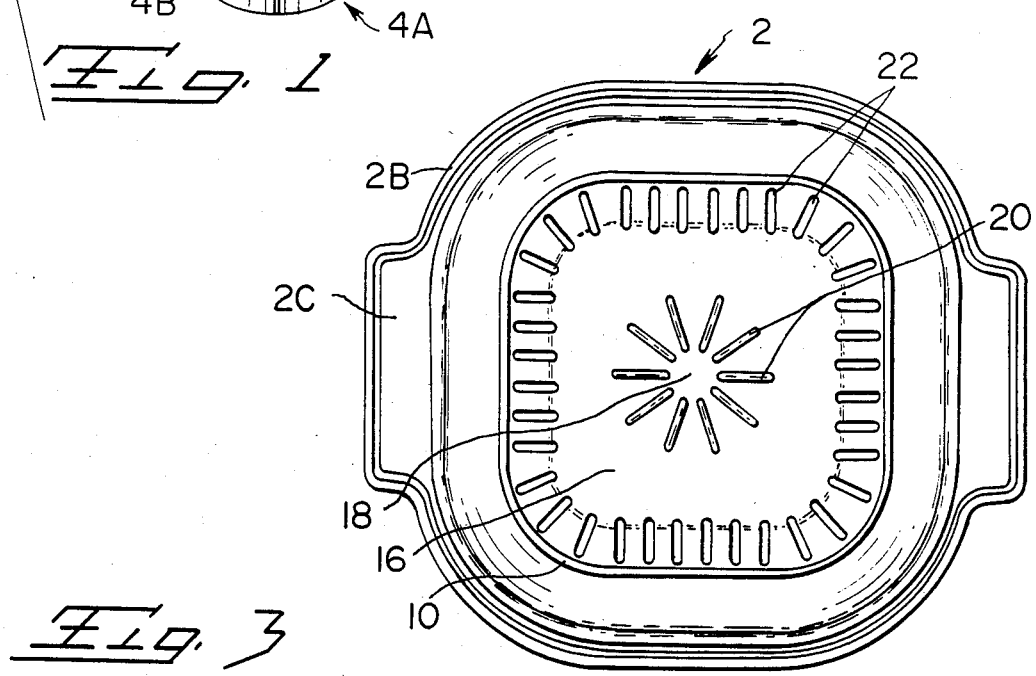

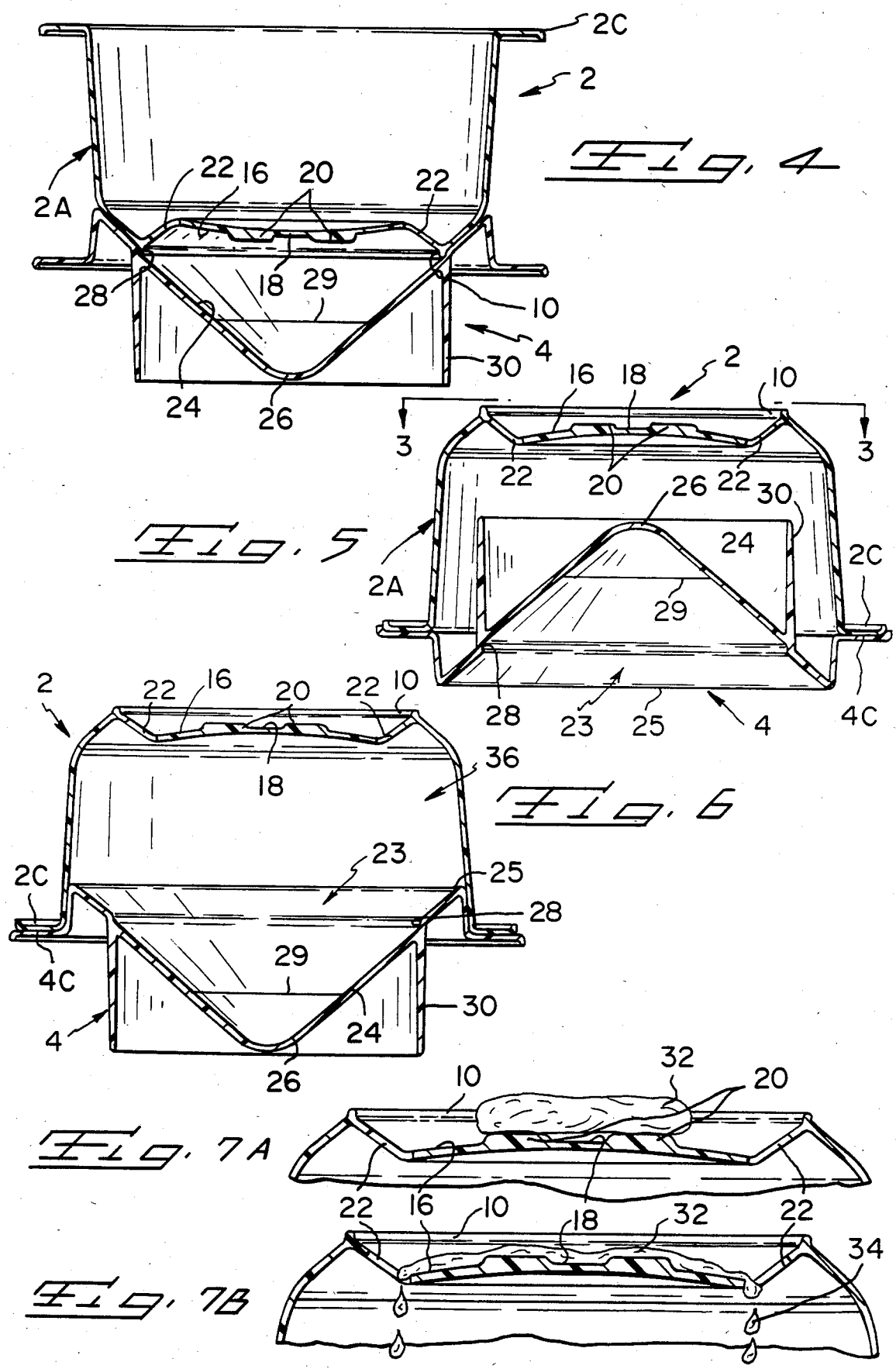

MICROWAVE OVENWARE ASSEMBLY FOR POPPING GRAIN

TECHNICAL FIELD

This invention relates to microwave oven receptacles designed to be selectively combined for popping grain in a microwave oven, serving the popped kernels for consumption, and nesting within one another for storage when not in use.

BACKGROUND OF THE INVENTION

Demand for microwave cookware, including cookware for popping grains such as popcorn, has grown with the rise in popularity of microwave ovens. This technology, while enthusiastically received, has presented myriad technical problems to those within the cookware industry concerned with providing the market with a satisfactory ovenware system for popping grain.

The industry has heretofore been unsuccessful in supplying an entirely satisfactory microwave ovenware system for popping grain because of the unique requirements placed upon such a system. For example, because a microwave oven is a convenience device, cookware therefore must be simple to use, easy to clean, and readily stored. Further, performance requirements dictate that such a system rapidly and completely cook the requisite amount of grain kernels with minimal waste. Moreover, since buttering capability is desirable, the assembly must provide means for melting and uniformly distributing a quantity of melted butter at the appropriate time upon the popped kernels. Finally, an acceptable system must be economically and readily manufacturable from microwave compatible materials.

Conventional electrical applicances for heating grains such as popcorn are well-known. Typically available devices provide a receptacle for receiving a quantity of grain, and exposing the kernels to a heat source, and a cover for containing the kernels during the popping cycle. The cover may be convertible into a container for serving the resultingly popped kernels for consumption as taught by U.S. Pat. No. 3,847,067.

However, this assembly is not appropriate for use in microwave ovens and is of a relatively complex and bulky configuration. Additionally, while in this known assembly there is provided a buttering device internally situated within the cover, the buttering device is not suited for microwave applications, and is not readily accessible during the cooking cycle.

Receptacles transparent to microwaves have been provided for popping grains. Such receptacles are preferably configured to provide a lower region of restricted internal volume for retaining the unpopped kernals in a massed grouping, and an upper region of greater volume for collecting and containing the popped grains. A preferred configuration for such a receptacle is conical, and is disclosed in general in U.S. Pat. Nos. 4,185,760 and 4,156,806. However, the receptacles of the type shown in the above patents require a specially designed supporting base or frame of microwave transparent material. Also, in such units a flat perforated lid is preferably provided for retaining popped kernels within the receptacle while allowing the escape of steam created by the heating of the kernels. Consequently, the capacity for storing popped grain is strictly limited by the downwardly restricted configuration of the conical wall. Moreover, receptacles of the representative type do not provide efficient externally accessible buttering means for melting and distributing molten butter on the popped kernels at an appropriate time.

DISCLOSURE OF INVENTION

The present invention provides a minimum number of two pieces adapted to be combined selectively for popping grain in a microwave oven, serving the popped kernels for consumption, and nesting within one another for storage when not in use. Integrally formed, yet externally accessible buttering means is provided for receiving a quantity of butter, melting same, and then uniformly applying the molten butter to popped kernels at an appropriate time.

Accordingly, it is an object of the present invention to provide a microwave ovenware assembly for popping and serving grain, of a two-piece receptacle construction.

Another object of the present invention is to provide a microwave ovenware assembly of microwave compatible composition which is comprised of economically and readily manufactured components.

Yet another object of the present invention is to provide a microwave ovenware assembly providing for positive registration and seating of component parts in various selective modes of assembly.

Still a further object of the present invention is to provide a microwave ovenware assembly which is readily used, cleaned, and stored.

A further object of the present invention is to provide a microwave ovenware assembly having integral and externally accessible butter melting and distributing means.

Another object of the present invention is to provide a microwave ovenware assembly for achieving efficient popping of a quantity of grain with minimal waste.

A further object of the present invention is to provide a microwave ovenware assembly which is economically and readily produced.

These and other objects, which will become apparent to those skilled in the art, are achieved by a preferred embodiment which is described in detail below, and which is illustrated by the accompanying drawings.

BRIEF DESCRIPTION OF DRAWINGS

FIG. 1 is an exploded perspective view of the two microwave transparent receptacles comprising the subject invention.

FIG. 2 is a perspective view of the two receptacles shown assembled in popping orientation.

FIG. 3 is a top plan view of the cover receptacle shown in FIG. 2.

FIG. 4 is a transverse sectional view showing the two microwave transparent receptacles assembled in a serving orientation.

FIG. 5 is a transverse sectional view showing the two microwave transparent receptacles assembled in nesting relation for storage.

FIG. 6 is a transverse sectional view through the assembled receptacles, taken along the Line 6—6 of FIG. 2.

FIG. 7-A is a cross-sectional view through the upper portion of the cover receptacle, showing placement of a portion of butter on butter receiving portions of the cover.

FIG. 7-B is a cross-sectional view through the upper portion of the cover receptacle in subsequence to FIG. 7-A, illustrating movement of the butter in melted state through the cover receptacle.

PREFERRED EMBODIMENT OF THE INVENTION

The two microwave-transparent receptacles comprising the subject invention are shown in popping relation in FIGS. 1 and 2, and generally comprise a cover receptacle (2), and a popping receptacle (4). These two receptacles may be made of any suitable and well-known micro-wave-transparent material, such as glass, ceramics and plastics, e.g., polysulfone and polycarbonate.

The two receptacles have lower base ends (2-A), (4-A), with upper outturned horizontal rim flanges (2-B), (4-B), respectively, which are nearly identical in size and shape and include diametrically opposite handle portions (2-C), (4-C), respectively. The two receptacles are generally of rounded square shape as viewed in plan, but the shape may be varied so long as the rim and handle portions are of a size and shape that they inter-fit one upon another as shown in FIG. 2, 4, 5, and 6.

With continued reference to FIGS. 1, 2, and 3, the receptacle (2) is adapted having four sides which taper outwardly from an upper end (6) thereof. Each of the four sides provides an acutely tapered sidewall portion (8) which is proximate to the upper end (6) of the cover receptacle (2). Extending about the perimeter of the cover receptacle (2) at the upper end (6) is an outturned vertical rim flange (10), provided for a purpose to be explained below. While the receptacle (2) is shown as having four sides, it will be appreciated that alternatively the receptacle may be of frustro-conical shape with portions of the sides tapered at the upper end as taught by portions (8).

Within the upper end (6) of the cover receptacle (2) is a cavity (12) defined by beveled sides (14) and an upwardly concave cavity floor surface (16). The concave floor surface (16) provides a center surface portion (18), from which radially, spaced apart rib segments (20) project. Further provided are a series of apertures (22), preferably in the form of slots, which are located at the periphery of, and which extend through, the concave floor surface (16). Each of the apertures (22) has a portion within the beveled sides (14) of the cavity (12) and which extends therethrough.

The popping receptacle (4) is adapted having an inverted pyramidal shaped cavity (23) extending therein, defined by inwardly tapering sides (24) which extend downwardly from an upper end (25). Tapering sides (24) terminate within the popping receptacle (4) at a circular bottom surface (26). The tapering sides (24) are profiled having an integrally formed downward step therein, which presents a vertical shoulder (28) extending circumferentially around the tapered walls (24) of the pyramidal cavity (23). The general pyramidal shape of the cavity (23) has been found to be desirable for popping kernels as it has a restricted lower region for holding the popped kernels in a clump, and a larger upper region allowing heated kernels to expand and pop, as disclosed in U.S. Pat. Nos. 4,158,760 and 4,156,806. The cavity (23) is shown having an inverted pyramidal profile, due to the overall square-round shape of receptacle (4). Alternatively, the receptacle (2), (4), may be of round configuration within the contemplation of the present invention, and the cavity (23) in such case would assume an inverted conical shape. A fill line (29) is provided to extend circumferentially around the tapered walls (24) of the pyramidal cavity (23), generally toward the circular bottom surface (26). Fill line (29) provides a visual indicator of the level to which unpopped kernels are to be added prior to popping. The popping receptacle (4), as shown, includes a cylindrical skirt portion (30) for supporting the pyramidal structure, thereby making the unit free-standing.

FIG. 4 illustrates the two receptacles (2), (4), in the serving position. It will be noted that the upper acutely tapered side wall portions (8) of the cover receptacle (2) are provided with a taper angle which compliments the inwardly tapered sides (24) of the pyramidal cavity (23). Further, the tapered side portions (8) extend into the cavity (23) far enough to permit the vertical rim flange (10) to abut against the popper receptacle shoulder (28). Continuous contact is thereby established between the cover receptacle (2) and the popper receptacle (4), from the upper rim (25) of the popper receptacle to the interior shoulder (28). This results in a positive seating of the cover receptacle (2), and tends to make the assembly resistant to inadvertent jarring.

With reference to FIG. 5, the cover receptacle (2) and the popping receptacle (4) are shown in a storage orientation. As will be appreciated, the popping receptacle (4) is adapted to be inverted and received within the cover receptacle (2) resulting in a low profiled, convenient storage assembly. The handle and rim portions 2-C, 4-C, and 2-B, 4-B of the receptacles (2), (4), respectively, are located and dimensioned to abut one another in this mode of assembly, and the cylindrical skirt (30) of the popping receptacle (4) is dimensioned such that it is received within the cover receptacle (2) with internal top and side clearance. The nesting or storage configuration enables the receptacles to be kept in a relatively small storage space.

Proceding to FIG. 6, the two receptacles (2), (4) are shown in the popping orientation also representatively shown by FIGS. 1 and 2. In order to pop grain in the microwave oven, the popping receptable (4) is situated in an upright orientation. A suitable quantity of unpopped grain is introduced into cavity (23) to a level indicated by the fill line (29). The unpopped grain thereby forms a clump in the lower portion of the pyramid. The cover receptacle (2) is then placed over receptacle (4) to form the assembly shown in FIG. 6., which is inserted into the microwave oven. As the heated grain expands or pops, the moisture released escapes as steam and is vented out through the slots (22), thus keeping the popped grain crisp and dry. When the grain is completely popped, it may overflow into the area (36) within receptacle (2).

It will be appreciated from FIG. 6 that the cover receptacle (2) interfits over the popping receptacle (4) such that the interior tapered walls (24) of the pyramidal cavity (23) extend downward from proximate the sides of the cover (2). This close relationship between the interior sides of the cover (2) and the upper rim (25) of the cone insures that popping grain which is propelled out unpopped of the pyramidal cavity (23) during the popping cycle will be recollected into the pyramid for popping. Waste in the form of unpopped kernels is thereby reduced. Further, the interior shoulder 28) formed by the integral step is vertical and therefore does not inhibit or detain reentry of unpopped kernels into the bottom of the pyramid during the popping cycle. It should further be noted that the exterior popping receptacle portion between the upper end of the pyramidal cavity (25) and the handle portion (4-C) is outwardly flared to compliment the outward tapering internal sides of the cover receptacle (2). This permits abutting engagement between the handle portions (2-C) and (4-C) of the receptacles, as well as a close contiguous relationship between the internal sides of the cover receptacle (2) and the upper end (25) of the pyramidal cavity (23).

With reference now to FIGS. 1 and 7-A, after the popping cycle has been or is about to be completed, the microwave oven can be opened and a solid portion of butter (32) positioned over the center surface portion (18) of the concave floor surface (16). The accessible location of the butter supporting surface portion (18) readily facilitates placement of the butter portion thereupon within the microwave oven, and the butter there located is confined by the beveled sides (14) and the floor surface (16) of the cavity (12).

Re-application of microwave radiation causes the butter portion to melt as illustrated in FIG. 7-B. As will be appreciated from a combined consideration of FIG. 1 and 7-B, the molten butter is directed from the center surface portion (18) to the peripheral apertures (22) by the radially extending rib projections (20). An even distribution of melted butter is thereby directed through each of the apertures (22) of the cover receptacle (2) to the popped kernels there below. In providing portions of each aperture to extend through both the concave bottom surface (16) and the beveled side surfaces (14) of the cover receptacle (2), simultaneous application of droplets of butter (34) and venting of steam from the popped kernels can be accommodated. This is because the droplets of butter (34) cannot entirely obstruct the apertures (22) to thereby interfere with proper ventilation of the cover receptacle.

Once the popping cycle has been completed, and butter applied if so elected by the user, the receptacles may be inverted while holding the overlapped handles together transferring all the popped grain into the cover receptacle (2). By now assembling the receptacle (2) in inverted fashion on top of receptacle (4), all the popped grain is accessible for serving and consumption. FIG. 4 illustrates the receptacles in the serving position, with the top of receptacle (2) inverted and seated into the pyramidal cavity of the popping receptacle (4). Any residue or particulates which filtrate through the apertures (22) are captured within the pyramidal cavity (23). The complimentarily tapered portions of the pyramidal cavity sidewalls (24) and the acutely tapered sides (8) of the cover receptacle, coupled with positive abutment between the vertical rim (10) and the interior shoulder (28) along a vertical plane, results in a physically stable assembly.

From the foregoing, it will be appreciated that the subject invention provides a microwave receptacle assembly for popping grain which is comprised of a minimum number of requisite parts. Further, the receptacles which comprise the assembly are readily molded from available microwave transparent materials, and each requires no subassembly. Moreover, the assembly achieves positive registration and seating of component parts in all modes of operation, resulting in a physically stable unit. Still further, the component parts can be selectively assembled to achieve nesting storage, efficient popping of the grain kernels, and serving of the resultingly popped kernels for consumption. The integral and externally accessible butter melting and distributing structure permits ready introduction of solid butter at the appropriate time in the cooking cycle, and improved means for uniformally distributing the melted butter on the popped kernels.

While the above sets forth a preferred embodiment of the present invention, other embodiments which will become apparent to those skilled in the art, and which utilize the teachings herein set forth, are intended to be within the scope and spirit of the subject disclosure.

We claim:

1. A microwave-transparent receptacle assembly adapted selectively for popping grain in a microwave oven and serving the popped kernels for consumption, comprising:

a free standing popper receptacle having a profiled popping chamber defined by convergent internal sidewalls extending downwardly therein from an upper end; and a cover receptacle having a downwardly open internal cavity for receiving popped kernels, said cover receptacle having a lower end adapted for closely receiving said popper receptacle upper end into said cover receptacle cavity, and an upper end portion externally profiled to complement said chamber profile, and adapted to seat within said popper receptacle chamber when assembled in an inverted position; and said upper end of said cover receptacle having aperture means extending therethrough into said cover receptacle cavity for venting vapor released from the popped grain.

2. A receptacle assembly as set forth in claim 1, wherein said cover receptacle cavity substantially receiving said popper receptacle therein in nesting relationship, with said popper receptacle oriented in inverted position.

3. A receptacle assembly as set forth in claim 1, wherein said popper receptacle chamber having a generally inverted pyramidal profile defined by said internal sidewalls, and said cover receptacle upper end portion having a complementary frustro-pyramidal external profile for seating positionment against said popper receptacle chamber sidewalls when assembled in an inverted position.

4. A receptacle assembly as set forth in claim 3, wherein said popper receptacle having an outwardly flared frustro-pyramidal external profile at said upper end, and said cover receptacle having a complementary internal profile at said lower end for close positionment over said popper receptacle external upper end profile.

5. A receptacle assembly as set forth in claim 4, wherein said internal sidewalls of said popper receptacle being profiled to provide inward facing shoulder means, and said cover receptacle having flange means at said upper end for engagement against said popper receptacle shoulder means when assembled in said inverted position.

6. A receptacle assembly as set forth in claim 5, wherein said shoulder means comprising a vertical step within said internal sidewalls extending the circumference of said pyramidal chamber.

7. A receptacle assembly as set forth in claim 5, wherein said cover receptacle flange means comprising an upturned vertical rim flange extending the circumference of said cover receptacle at said upper end.

8. A receptacle assembly as set forth in claim 7, wherein said upper end portion of said cover receptacle upwardly terminating at said vertical rim flange.

9. A receptacle assembly as set forth in claim 1 or claim 8, wherein said cover receptacle aperture means comprising a butter receiving resevoir formed within said upper receptacle end, defined by side and bottom surfaces, and having a peripheral series of apertures through said bottom surface.

10. A receptacle assembly as set forth in claim 9, wherein said bottom reservoir surface being upwardly concave and having a center portion for supporting a solid portion of butter thereon.

11. A receptacle assembly as set forth in claim 10, said bottom reservoir surface further comprising a series of mutually spaced apart upward projecting rib segments extending radially from said center portion for directing molten butter to the periphery of said bottom reservoir surface.

12. A receptacle assembly as set forth in claim 11, wherein said side surfaces of said reservoir tapering inward from said upper end of said storage receptacle, and said series of apertures each having a portion extending through said reservoir side surfaces.

* * * * *